United States Patent

Koukal et al.

[11] Patent Number: 5,277,656
[45] Date of Patent: Jan. 11, 1994

[54] MOTOR VEHICLE ENGINE BONNET

[75] Inventors: Heinz Koukal; Klaus Arold, both of Sindelfingen, Fed. Rep. of Germany

[73] Assignee: Mercedes-Benz AG, Fed. Rep. of Germany

[21] Appl. No.: 918,116

[22] Filed: Jul. 22, 1992

Related U.S. Application Data

[63] Continuation of Ser. No. 609,634, Nov. 6, 1990, abandoned.

[30] Foreign Application Priority Data

Nov. 6, 1989 [DE] Fed. Rep. of Germany ....... 3936852

[51] Int. Cl.⁵ .............................................. B60H 1/28
[52] U.S. Cl. .................................................. 454/147
[58] Field of Search ................ 454/143, 146, 147, 148

[56] References Cited

U.S. PATENT DOCUMENTS

| | | |
|---|---|---|
| 1,948,283 | 2/1934 | Boca . |
| 2,011,840 | 8/1935 | Arnold et al. ................ 98/2.17 |
| 2,685,244 | 8/1954 | Wahlberg . |
| 2,836,113 | 5/1958 | Seyfarth .................. 98/2.16 X |
| 2,975,696 | 3/1961 | Jewell .................... 98/2.17 |
| 4,646,864 | 3/1987 | Racchi ................... 180/69.22 |

FOREIGN PATENT DOCUMENTS

| | | |
|---|---|---|
| 7231652 | 8/1972 | Fed. Rep. of Germany . |
| 1680065 | 12/1973 | Fed. Rep. of Germany . |
| 2242107 | 6/1979 | Fed. Rep. of Germany ....... 98/2.17 |
| 3107722 | 9/1982 | Fed. Rep. of Germany . |
| 1210949 | 3/1960 | France . |
| 1252702 | 12/1960 | France . |
| 30821 | 2/1983 | Japan ................................ 98/2.17 |
| 1008750 | 11/1965 | United Kingdom . |
| 2153754 | 8/1985 | United Kingdom ................ 98/2.17 |

*Primary Examiner*—Harold Joyce
*Attorney, Agent, or Firm*—Evenson, McKeown, Edwards & Lenahan

[57] ABSTRACT

An engine bonnet integrates a water separation facility while dispensing with expensive additional parts which were hitherto necessary in order to separate concomitantly entering water from the air for a heating and air-conditioning system flowing in via an air inlet situated in the engine bonnet or between the rear edge of the engine bonnet and the windscreen. The necessary inner reinforcement of the engine bonnet panel is configured in such a way along that side of the engine bonnet which is turned towards the windscreen that it simultaneously feeds the air stream entering via an air inlet in the engine bonnet to an air-fill chamber situated upstream of the air intake duct of the heating or air-conditioning system that water separation also occurs in addition.

19 Claims, 2 Drawing Sheets

5,277,656

MOTOR VEHICLE ENGINE BONNET

This is a continuation of application Ser. No. 07/609,634, filed Nov. 6, 1990 abandoned.

BACKGROUND AND SUMMARY OF THE INVENTION

The present invention relates to an engine bonnet for a motor vehicle having an air inlet for a heating or air-conditioning system.

Dirt particles and water can penetrate undesirably through the air inlet opening situated in the accumulation region in front of the windscreen for the fresh air supply to a motor vehicle heating or air-conditioning system. It must be ensured that the undesired water cannot get into the inside of the vehicle along with the airstream.

Thus, in German Patent No. 1,680,065, diversion or deflection devices are fitted within an air-fill chamber and are provided with outlet devices. For this purpose, however, additional parts are necessary, which are furthermore not accessible in a simple manner for cleaning purposes.

The object of the present invention is to achieve separation of water from the fresh air fed to a heating or air-conditioning system of a motor vehicle without involving expensive additional parts.

This object has been achieved according to the present invention by forming at least one trough closed at the bottom as the region of the reinforcement underneath the air inlet opening, and arranging inlet openings of guide passages at the trough edge. A necessary reinforcement of the engine bonnet for stability purposes in the region of the air inlet opening is constructed in such a way that it simultaneously guides the inflowing air stream into a hollow and from there into a higher region before the air stream leaves the engine bonnet reinforcement in the direction of the heating or air-conditioning system. With this construction, it is possible in an advantageous manner to integrate a water separation facility into the reinforcement of the engine bonnets of motor vehicles and thus to dispense with further additional parts.

BRIEF DESCRIPTION OF THE DRAWINGS

These and further objects, features and advantages of the present invention will become more apparent from the following detailed description of several presently preferred embodiments when taken in conjunction with the accompanying drawings, wherein.

DETAILED DESCRIPTION OF THE DRAWINGS

Figure 1:
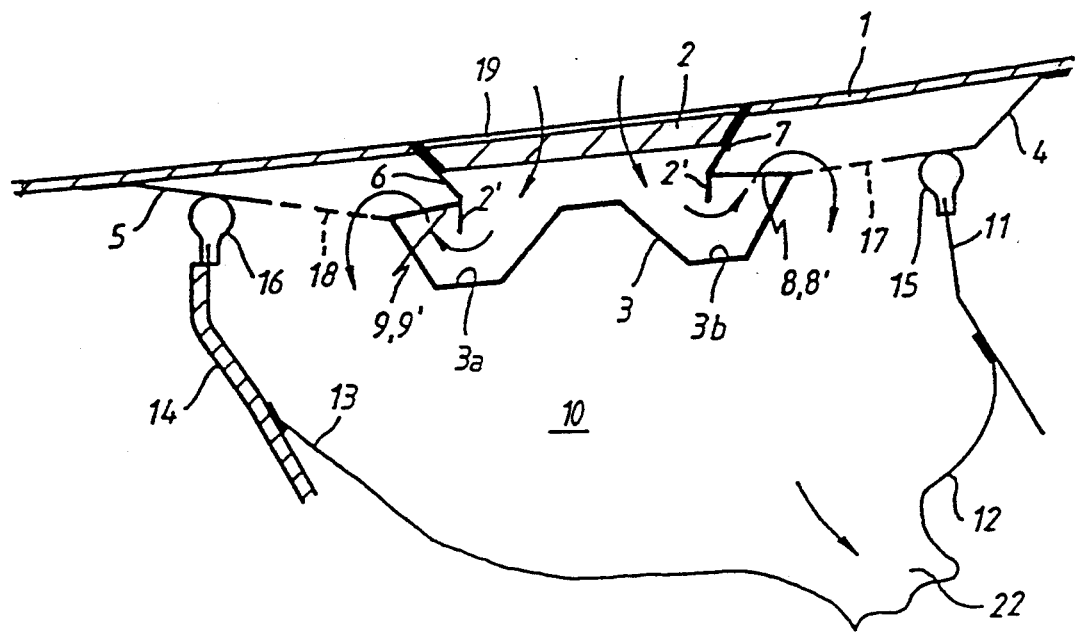
FIG. 1 shows a schematic longitudinal sectional view through an engine bonnet in the region of the air inlet opening, with an inner reinforcement according to the present invention.

FIG. 1 shows an air inlet opening 19 in the engine bonnet 1, which opening 19 is provided with an air inlet grill 2 ending flush with the top surface of the engine bonnet 1 to hold back coarse dirt particles. In order to facilitate accessibility to the parts situated underneath the air inlet grill 2, the grill 2 is secured on the engine bonnet 1 or on air guide plates 6, 7 forming an inlet nozzle for the air in such a way that it can be removed outwardly. Extending underneath the air inlet opening 19 is a section 3 of the engine bonnet reinforcement, which section is W-shaped in cross section. Two self-contained troughs 3a, 3b are thus formed. A division of the air stream thereby takes place and then a deflection of the two part-streams by virtue of the fact that the air guide plates 6, 7 are extended into the troughs 3a, 3b to below the trough edge and limit the inlet cross-section. This configuration compels an upward deflection of the air stream in the region of the troughs and thereby makes possible optimum separation of water, which remains in the troughs 3a, 3b.

The section 3 of the engine bonnet reinforcement which forms the troughs 3a, 3b rests in an air-tight manner on an air-fill chamber 10, as will be described below in detail.

After passing through the troughs 3a, 3b, the two air streams pass through the inlet openings 8, 9, fitted with air-permeable braces 8', 9' between the trough edge and the air guide plates 6, 7, into guide passages which lead to a heating/air-conditioning system. During this process, the air streams first pass upwards into two air chambers directly underneath the engine bonnet, are there deflected again and leave the region of the reinforcement downwards via two air outlet openings 17, 18 designed as air-permeable sections of the reinforcement of the engine bonnet into an air-fill chamber 10 delimited by air guide plates 11, 12, 13, from where the air is passed on to the heating or air-conditioning system.

Adjoining the air outlet openings 17, 18 on both sides are parts 4, 5 of the section 3 of the engine bonnet reinforcement. The parts 4, 5 are self-contained and are carried against the inside of the engine bonnet panel and firmly attached there. With parts 4, 5, the engine bonnet reinforcement rests air-tightly against seals 15, 16. The seals 15, 16 guarantee that, with the engine bonnet 1 closed, only intake air can get to the air-fill chamber 10 through the air inlet opening 19 of the engine bonnet 1. Contaminated air or gases from the engine compartment adjoining the front wall 14 are thereby prevented from getting into the heating or air-conditioning system.

By virtue of the described ducting of the air stream, fine dirt or water can settle in the two troughs 3a, 3b. The desired water separation is thus guaranteed without further additional parts by the design of the reinforcement according to the present invention, and the troughs 3a, 3b are easily accessible for purposes of cleaning.

Figure 2:
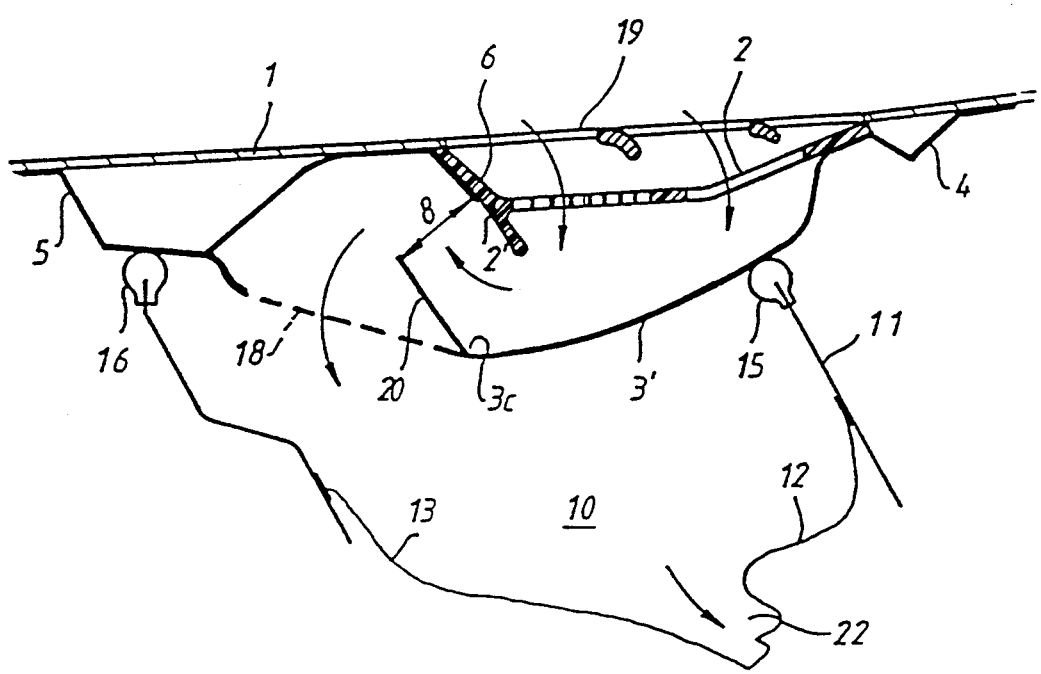
FIG. 2 is a similar longitudinal sectional view through a further embodiment of the present invention.

In an embodiment according to FIG. 2, the air inlet grill 2 is attached to sections of the reinforcement underneath air inlet opening 19 of the engine bonnet 1. Both the rib-shaped air inlet opening 19 and the air inlet grill 2 are secured in such a way that they can be removed outwards for purposes of cleaning. The part 4 of the engine bonnet reinforcement in the region of the air inlet opening which is on the windscreen side is of self-contained design and secured on the engine bonnet 1. Adjoining the section 3' in the region of the air inlet opening 19, the section 3' likewise being of self-contained design and ending in the form of a trough 3c, there is once again, at the front side, a section 18, such as a perforated plate, of the reinforcement. The section 18 serves as an air outlet opening and is again attached to the inside of the engine bonnet panel 1, via section 5, which is of self-contained design.

In the embodiment of FIG. 2 in contrast to the embodiment according to FIG. 1, only one trough 3c is provided, and the air stream is not divided. A side wall 20 of the trough 3c is used to deflect the air stream forwards and upwards. For optimum deflection of the air stream, the forward wall 6 of the air inlet grill 2 is extended downwardly 2' in the direction of the trough 3c as far as the level of the trough edge, which, with the wall 6 situated opposite, forms the inlet opening 8 of the air guide passage.

After passing through the inlet opening 8, the air stream is deflected again by the self-contained section 5 of the reinforcement and emerges downwards from the reinforcement through the perforated plate 18 into the air-fill chamber 10 delimited by the guide plates 11, 12, 13, from where the air is fed in a known manner, via a feed duct 22 to the heating or air-conditioning system, as in the embodiment of FIG. 1.

Figure 3:
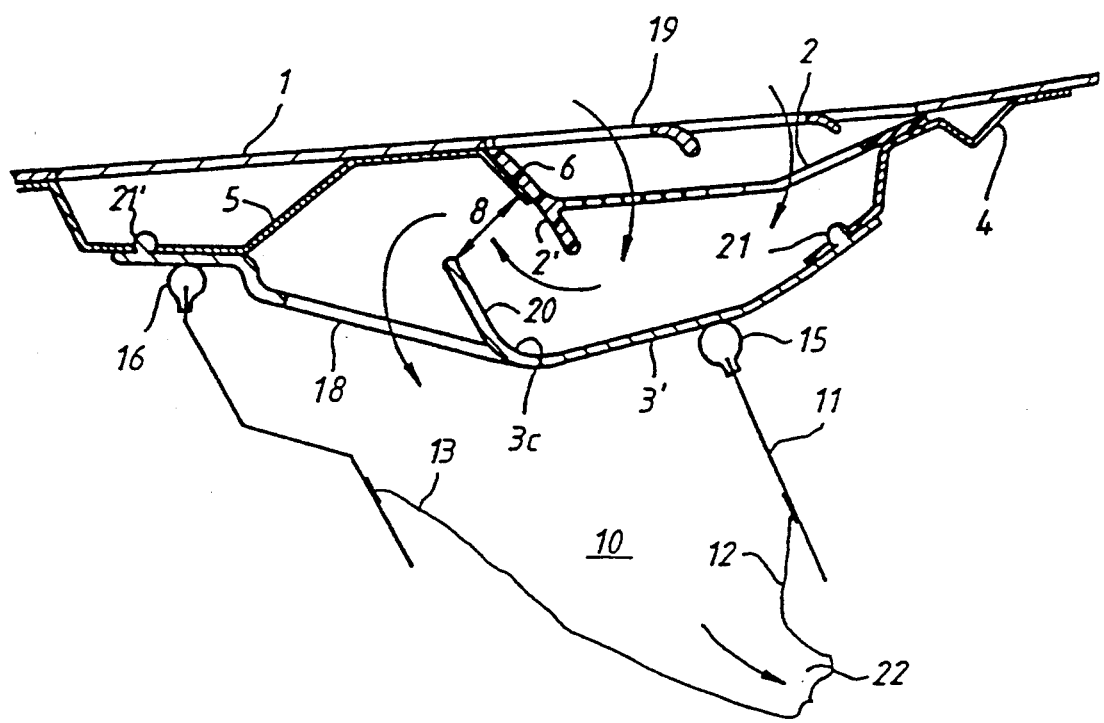
FIG. 3 is a longitudinal sectional view through a third embodiment.

In the embodiment of FIG. 3, the arrangement of the inner reinforcement largely corresponds to the embodiment illustrated in FIG. 2. The reinforcement is, however, now fabricated from plastic, and the trough region 3c together with the air-permeable section 18 is attached releasably, via simple plug-in connections 21, 21', to the self-contained reinforcement sections 4 and 5 which are firmly connected to the engine bonnet. To remove dirt which has settled there, the trough can thus be removed inwardly in a simple manner when the bonnet is open, and then cleaned.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An engine bonnet for a motor vehicle, comprising an air inlet opening for supply of air flowing in to a heating or air-conditioning system, a reinforcement member arranged on an inside portion of the bonnet at two opposed sides of the air inlet opening as viewed in a longitudinal direction of the motor vehicle and configured to reinforce the bonnet, and at least one air outlet opening for the air flowing in being provided between the air inlet opening and the heating or air-conditioning system, wherein the reinforcement member extends underneath the air inlet opening and has a region which forms at least one trough closed at the bottom, and the outlet openings are so arranged at an edge of the trough to separate the flowing air from water and other foreign material which remains in the trough.

2. The motor vehicle bonnet according to claim 1, wherein a reinforcement underneath the air inlet opening rests air tightly on an air-fill chamber.

3. The motor vehicle bonnet according to claim 1, wherein an inward-projecting inlet nozzle is adjacent an edge of the air inlet opening, and at least one wall of the inward-projecting inlet plate inlet nozzle projects into the region of the trough at least as far as the level of the trough edge.

4. The motor vehicle engine bonnet according to claim 3, wherein the region of the reinforcement underneath the air inlet opening rests air tightly on an air-fill chamber.

5. The motor vehicle engine bonnet according to claim 1, wherein at least one trough constitute two troughs having a W-shaped cross-section, and the air flowing in is divided and fed to an air-fill chamber via the inlet openings with downstream guide passages.

6. The motor vehicle engine bonnet according to claim 5, wherein the region of the reinforcement underneath the air inlet opening rests air tightly on an air-fill chamber.

7. The motor vehicle engine bonnet according to claim 6, wherein an inward-projecting inlet nozzle is operatively arranged at the air inlet opening and at least one wall of the inlet nozzle projects into the region of the trough at least as far as the level of the trough edge.

8. The motor vehicle bonnet according to claim 3, wherein the side wall is connected to a reinforcement of the engine bonnet via braces arranged in a guide passage inlet opening region.

9. The motor vehicle engine bonnet according to claim 8, wherein at least one trough constitutes two troughs having a W-shaped cross-section, and the air flowing in is divided and fed to an air-fill chamber via the inlet openings with downstream guide passages.

10. The motor vehicle engine bonnet according to claim 1, wherein the air inlet opening is provided with an air inlet grill.

11. The, motor vehicle engine bonnet according to claim 10, wherein a reinforcement region underneath the air inlet opening rests air tightly on an air-fill chamber.

12. The motor vehicle engine bonnet according to claim 11, wherein an inward-projecting inlet nozzle is operatively arranged at the air inlet opening and at least one wall of the inlet nozzle projects into the region of the trough at least as far as the level of the trough edge.

13. The motor vehicle engine bonnet according to claim 12, wherein at least one trough constitutes two troughs having a W-shaped cross-section, and the air flowing in is divided and fed to an air-fill chamber via the inlet openings with downstream guide passages.

14. The motor vehicle engine bonnet according to claim 13, wherein the side wall is connected to the reinforcement of the engine bonnet via braces arranged in the region of the inlet openings of the guide passages.

15. The motor vehicle engine bonnet according to claim 10, wherein the air inlet grill is flush with an outer surface of the engine bonnet and is provided with means for securing such a way that it can be removed outwardly.

16. The motor vehicle engine bonnet according to claim 1 wherein the means for releasably securing the at least one trough.

17. The motor vehicle engine bonnet according to claim 16, wherein an inward-projecting inlet nozzle is adjacent an edge of the air inlet opening, and at least one wall of the inlet nozzle projects into the inward-projecting region of the trough at least as far as the level of the trough edge.

18. The motor vehicle engine bonnet according to claim 17, wherein at least one trough constitutes two troughs having a W-shaped cross-section, and the air flowing in is divided and fed to an air-fill chamber via the inlet openings with downstream guide passages.

19. The motor vehicle engine bonnet according to claim 16, wherein the reinforcement member is plastic and the trough securing means are plug-in connections.

* * * * *